(12) United States Patent
Kaasa et al.

(10) Patent No.: US 7,375,726 B2
(45) Date of Patent: May 20, 2008

(54) METHOD AND SYSTEM FOR SIMULATION OF A THREAD IN COMPUTER GRAPHICS SIMULATIONS

(75) Inventors: Johannes Kaasa, Oslo (NO); Kyrre Strøm, Oslo (NO); Geir Westgaard, Soflemyr (NO); Jan Sigurd Røtnes, Oppegård (NO)

(73) Assignee: Simsurgery AS, Oslo (NO)

( * ) Notice: Subject to any disclaimer, the term of this patent is extended or adjusted under 35 U.S.C. 154(b) by 499 days.

(21) Appl. No.: 10/250,375

(22) PCT Filed: Jan. 8, 2002

(86) PCT No.: PCT/NO02/00009

§ 371 (c)(1),
(2), (4) Date: Jul. 1, 2003

(87) PCT Pub. No.: WO02/054370

PCT Pub. Date: Jul. 11, 2002

(65) Prior Publication Data

US 2004/0222993 A1    Nov. 11, 2004

(30) Foreign Application Priority Data

Jan. 8, 2001    (NO)    ................... 20010127

(51) Int. Cl.
*G06T 17/00* (2006.01)
*G06T 15/00* (2006.01)

(52) U.S. Cl. ...................... 345/420; 345/419
(58) Field of Classification Search .......... None
See application file for complete search history.

(56) References Cited

U.S. PATENT DOCUMENTS 4,321,047 A    3/1982    Landis ................. 434/262

5,692,117 A *  11/1997   Berend et al. ........... 345/475

(Continued)

FOREIGN PATENT DOCUMENTS

WO    WO 92/04860    4/1992

(Continued)

OTHER PUBLICATIONS

Pieper et al., "Interactive graphics for plastics surgery: a task-level analysis and implementation", Jun. 1992, Proceedings of the 1992 symposium on Interactive 3D graphics.*

(Continued)

*Primary Examiner*—Ulka Chauhan
*Assistant Examiner*—Daniel F Hajnik
(74) *Attorney, Agent, or Firm*—Birch, Stewart, Kolasch & Birch, LLP

(57) ABSTRACT

Method for describing a thread as a geometric object in a three dimensional computer graphics system. The method comprises generating a set of fixture points defining points in space through which the thread passes, generating a set of one or more segments representing the thread between adjacent fixture points, linking each segment to a pair of fixture points, one at each end of the respective segment, and describing the geometrical properties of each segment. The segments and fixture points are preferably defined as objects containing functions and variables allowing the exchange of data between the various objects. The method allows for the calculation of the shape of the thread based on a calculation of the shape of each individual segment. A simulation system utilizing the method receives update information such as control signals, over an input interface and includes instructions on a storage media and a processor for calculating the shape of the thread and outputting the result over an output interface.

31 Claims, 5 Drawing Sheets

U.S. PATENT DOCUMENTS

Figure 1:
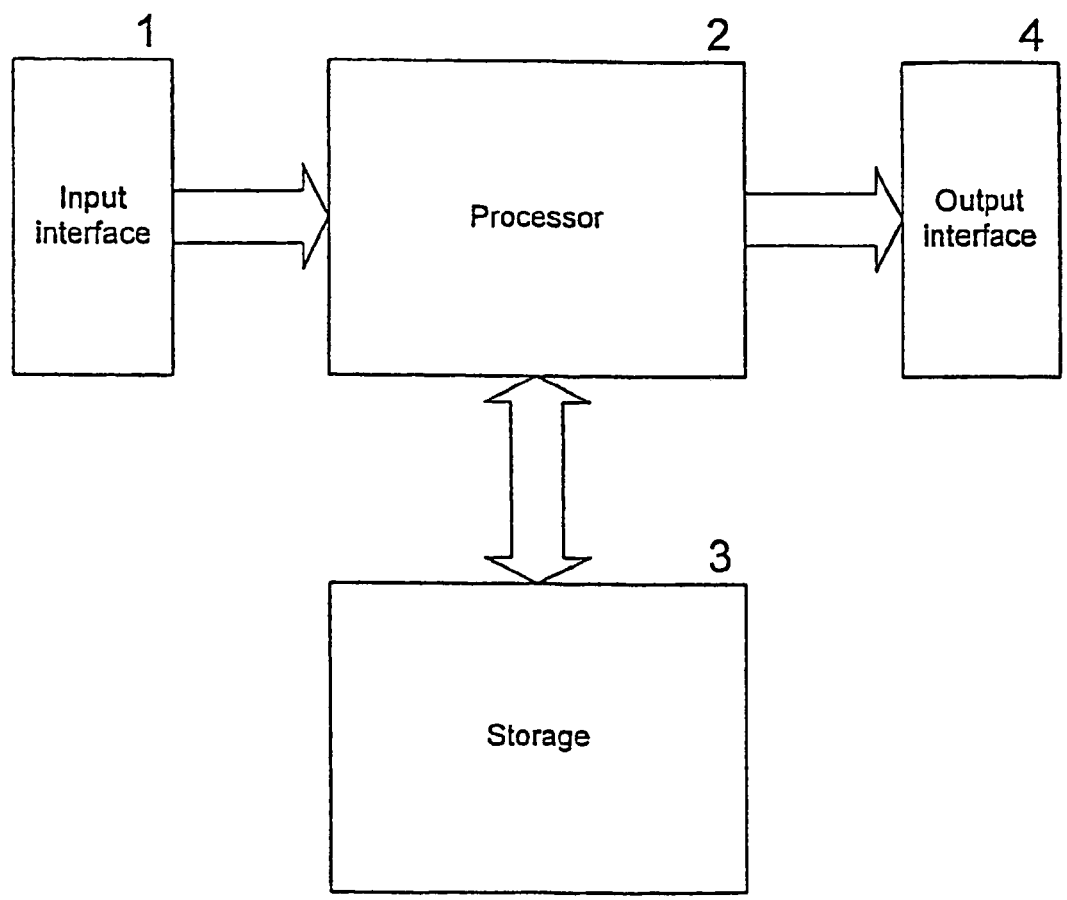

| | | | | |
|---|---|---|---|---|
| 5,766,016 | A | 6/1998 | Sinclair et al. | 434/262 |
| 5,956,040 | A | 9/1999 | Asano et al. | 345/419 |
| 6,204,860 | B1 * | 3/2001 | Singh | 345/420 |
| 6,707,452 | B1 * | 3/2004 | Veach | 345/423 |

FOREIGN PATENT DOCUMENTS

| | | |
|---|---|---|
| WO | WO 98/24083 | 6/1998 |

OTHER PUBLICATIONS

Tritto et al., "New perspectives in simulation planning of skin wound suture in plastic surgery", Engineering in Medicine and Biology Society, 1988. Proceedings of the Annual International Conference of the IEEE Nov. 4-7, 1988 pp. 663-664 vol. 2.*

Keeve et al., "Anatomy-based facial tissue modeling using the finite element method", Visualization '96. Proceedings. Oct. 27-Nov. 1, 1996 pp. 21-28, 465.*

Ganovelli et al., "Enabling cuts on multiresolution representation", Computer Graphics International, 2000. Proceedings Jun. 19-24, 2000 pp. 183-191.*

U. Kuhnapfel, H.K. Cakmak, H. MaaB, "Endoscopic surgery training using virtual reality and deformable tissue simulation", Dynamic Medical Visualization, Computers & Graphics 24 (2000), pp. 671-682.*

Elke Hergenröther and Patrick Dähne, "Real-Time Virtual Cables Based on Kinematic Simulation", In Proc. WSCG '2000, The 8-th International Conference in Central Europe on Computer Graphics, Visualization and Interactive Digital Media 2000, pp. 402-409. University of West Bohemia, Plzen, Czech Republic, Feb. 2000.*

Roland Glowinski & Patrick Le Tallec, "Augmented Lagrangian and Operator-Splitting Methods in Nonlinear Mechanics," Society for Industrial and Applied Mathematics, Philadelphia, 1989, Chap. 8, pp. 259-286.

Playter et al., "A Virtual Surgery Simulator Using Advanced Haptic Feedback," *Minimally Invasive Therapy and Allied Technology*, 1997, vol. 6, pp. 117-121.

Webster et al., "A Prototype Haptic Suturing Simulator," *Medicine Meets Virtual Reality*, IOS Press, 2001, pp. 567-569.

Larsson, "Intracorporeal Suturing and Knot Tying in Surgical Simulation," *Medicine Meets Virtual Reality*, IOS Press, 2001, pp. 266-271.

Montgomery et al., "A Virtual Environment for Training in Microsurgery," Part of the IS&T/SPIE Conference on The Engineering Reality of Virtual Reality 1999, San Jose, California, Jan. 1999, pp. 398-403.

Kuhnapfel et al., "3D Modeling for Endoscopic Surgery," IEEE-SB Symposium on Simulation, Delft, NL, Oct. 13, 1999.

Morishima S and Sony Corp, "Information Processor for Computer Graphics, Detects Interpolation Points on the Curve, Based on Which Interpolation Data is Produced, to Pattern the Thread Like Object", Patent Abstract of Japan, JP No. 2000-322587, Nov. 24, 2000.

* cited by examiner

METHOD AND SYSTEM FOR SIMULATION OF A THREAD IN COMPUTER GRAPHICS SIMULATIONS

The invention relates to a method for describing a thread as a geometric object in a three dimensional computer graphics system. The invention also relates to a computer simulation system employing said method for simulation of systems involving a thread. It should be understood that the term thread will be used throughout this description for convenience, but that it is intended to cover other terms including, but not limited to, suture, wire, cable, rope etc, to the extent that such objects can be described in a computer graphics system in accordance with the method claimed.

Training for surgical procedures such as sewing together two or more flexible objects, has traditionally been limited to training on human cadavers or animals. In recent years computer simulators have been developed in order to overcome limitations in traditional training and increase accessibility for health care personnel and students learning surgical skills, as well as experienced surgeons maintaining skills or learning new methods based on development in technology.

An example of a surgical simulator is described in U.S. Pat. No. 5,766,016. The simulator provides both visual and tactile feedback. Visual feedback is provided through a graphics computer driving a stereo display, and a set of optics mimicking a surgical microscope. Tactile feedback is provided through an instrument simulating a surgical tool and connected through levers and hinges to servo-motors generating a resistive force along any direction. The simulator preferably simulates ocular surgery and displays a model of an eye. The model of an eye is produced by first photographing components of the eye, texture mapping the photographs and developing a mathematical model of the eye. There is no description of how surgical threads or sutures could be modeled.

U.S. Pat. No. 4,321,047 discloses an apparatus for teaching surgical knot tying techniques. A flexible tube made of material which simulates various human vessels and ducts is positioned between the arms of a support frame. Inside the tube are spring wires, which are strung under tension between the arms of the support frame. A detecting device is connected to the wires, which will generate various kinds of signals when the wires make contact with one another. The student loops a piece of surgical thread around the tube and tightens the loop until wires touch, thus indicating that a certain force has been applied to the tube by the loop. No computer simulation is involved.

U.S. Pat. No. 5,956,040 discloses a simulation system using computer graphics and a model expression method capable of giving reality to the deformation of a model described by using polygons. Simulation of the behavior of a surgical thread is not described.

The above mentioned publications do not describe suture simulation, or simulation of surgical thread, on computers. Because of the importance of the ability of a simulator to accurately portray the actual conditions under which a surgical procedure is performed, and because of the wide range and number of such procedures involving sutures, a sufficiently exact modeling of a surgical thread in a surgical simulator is of great importance.

It should, however, be pointed out that although the above examples involve surgical simulation, and although the embodiment described herein concerns such an application, the present invention may easily be adapted for other purposes. Examples include sewing in a tailoring process, simulation or virtual reality systems where threads or cables are to be modeled, or computer graphics or animation of a more general nature, such as computer games or movies, where a thread or a cable is to be visualized in a natural and convincing way. It should then be clear that the term simulation-system is not limited to traditional simulators, but also includes systems for numerical simulation of engineering problems involving threads or cables, and also computer graphics workstations for generating a computer graphics representation that e.g. will be played back as a movie or a presentation.

"Augmented Lagrangian and Operator-Splitting Methods in Nonlinear Mechanics", by Roland Glowingski and Patrick Le Tallec, Society for Industrial and Applied Mathematics, Philadelphia, 1989, chapter 8, p. 259-286, discusses numerical modeling of flexible and inextensible rods, particularly in the context of flexible pipelines used in off-shore production. The numerical modeling described could be adapted for use with the present invention. The above mentioned chapter as well as the algorithms described in chapter 3 of the same reference are hereby incorporated by reference.

The numerical representation of a thread, cable, wire or the like, particularly if it interacts with other objects, requires extensive computational effort. This can be a critical factor in numerical simulation or computer graphics, especially if the simulation is to run in real time, such as in a simulator. The invention is based on a data structure that overcomes this bottleneck and allows for rapid description and update of a thread in a computer graphics environment.

The data structure models the thread as a set of segments connected to each other by fixture points that represent points through which the thread passes. The shape of the thread is then described by describing the shape of each segment independently. The update of the model is based on passing information from one segment to the next and on moving, adding or deleting fixture points.

More particularly the description of a thread includes the generation of a set of fixture points defining points in space through which the thread passes, and the generation of a set of one or more segments representing the thread between adjacent fixture points. Each segment is linked to a pair of fixture points, one at each end of the respective segment, and the geometrical properties of each segment are described.

In order to simplify the model further, segments of the thread that pass through other objects may be described as straight lines between fixture points attached to the surface of the object through which the thread passes, at the respective points where the thread enters or leaves the object. Such a segment will henceforth be referred to as an embedded segment. Other segments will be referred to as free segments.

The actual geometrical description of a segment is preferably done as a reference to a curve definition including the numerical description of the shape of the curve. This can be done by defining the segment as an object in an object oriented computer language and including in this object a pointer to an additional object that includes the necessary curve parameters and algorithms for calculating the shape of the curve. These additional objects will be referred to as curve objects. For a given segment, the curve instance (i.e. the result of the curve shape calculation) will then be stored in the curve object, which also includes the necessary functions to calculate this curve instance from information received from the segment object. The curve of an embedded segment is a straight line between two fixture points, while the curve of a free segment is calculated based on the position of the fixture points at each end of the segment, gravity vectors, and any other parameters such as flexibility of the thread, tangent of the curve through the fixture point, length of the segment, distance between fixture points etc.

Preferably the fixture points as well as any other geometrical objects are similarly described in an object oriented manner. The segments will then include pointers to two fixture points, and the fixture points will include pointers to segments and possibly to an other geometrical object and a variable containing the position of the fixture point.

Additional data and functions of the various objects will be described in greater detail below.

In a computer simulation system the data structure will be stored as data and instructions on a data storage accessible by a processor. The processor will be able to, based on the data and the instructions, generate a three dimensional numerical model of the thread and any objects with which the thread interacts and to generate a video representation of this numerical model.

The simulation system also includes an input interface for receiving control signals representing manipulation of the simulation system and an output interface for sending the generated video representation to a video display.

The invention also relates to a computer program comprising program instructions for performing the steps of the method. Such a program could be embodied as a computer program product stored on a computer readable medium such as a CD ROM or any other storage medium, storing the information that makes up such a computer program.

The defining features of the invention are presented in the attached independent claims, with the dependent claims describing additional features.

The invention will now be described in greater detail by way of examples and with reference to the attached drawings.

Figure 2:
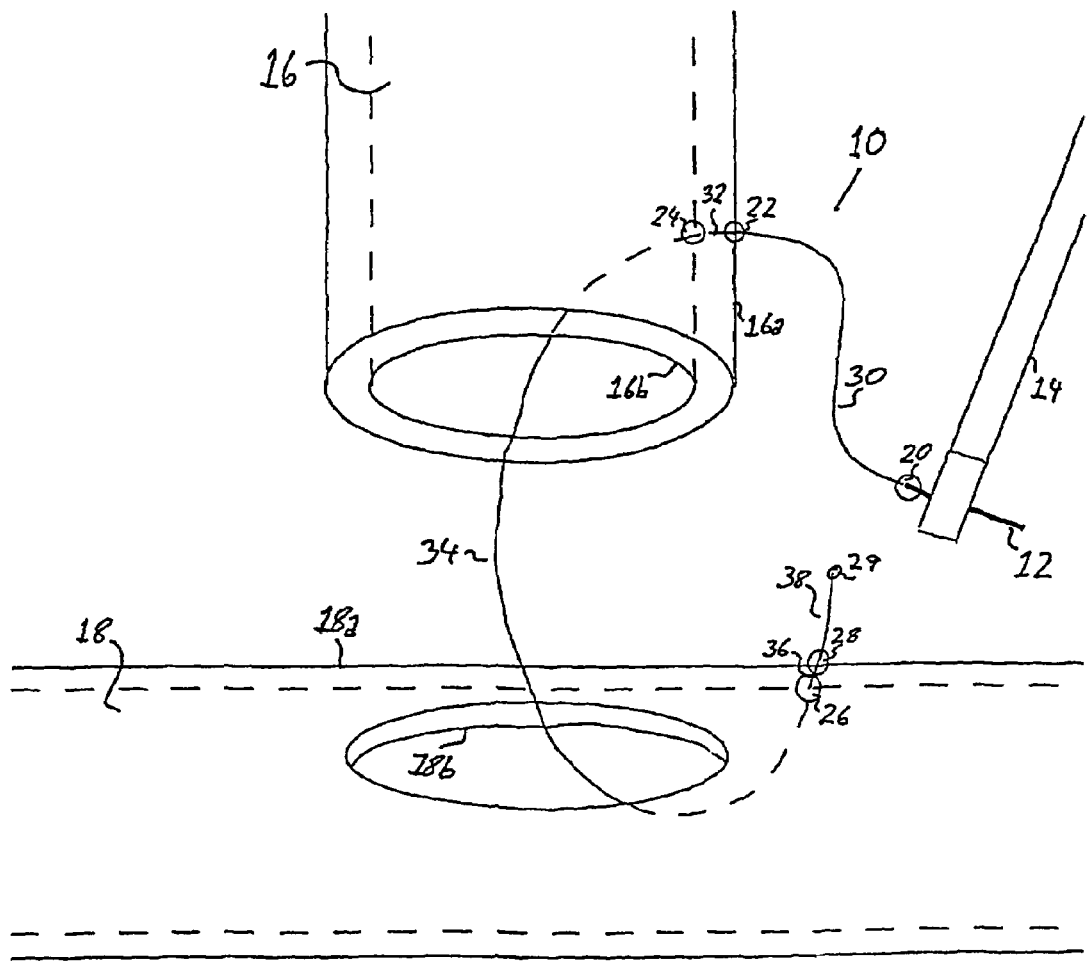
Figure 3A:
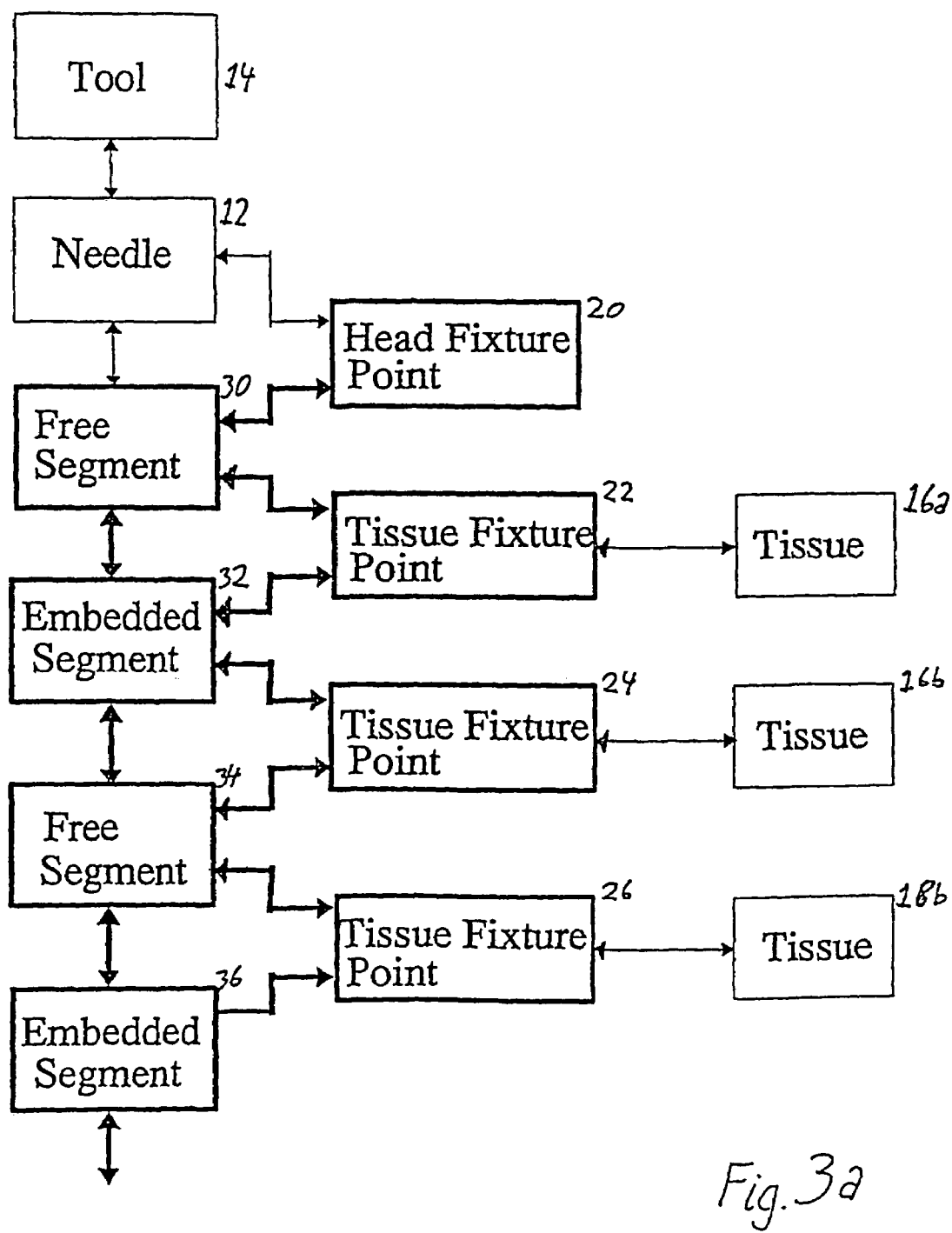
Figure 3B:
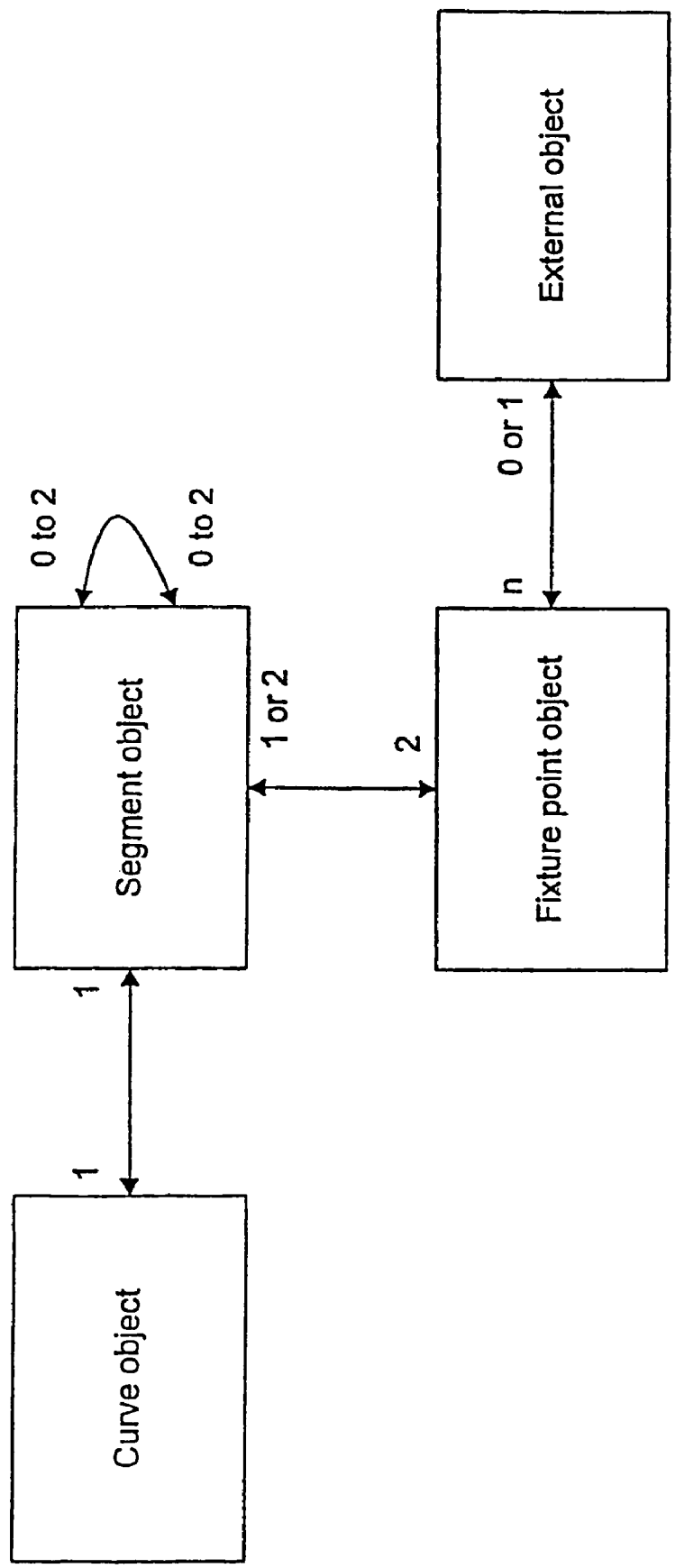
Figure 4:
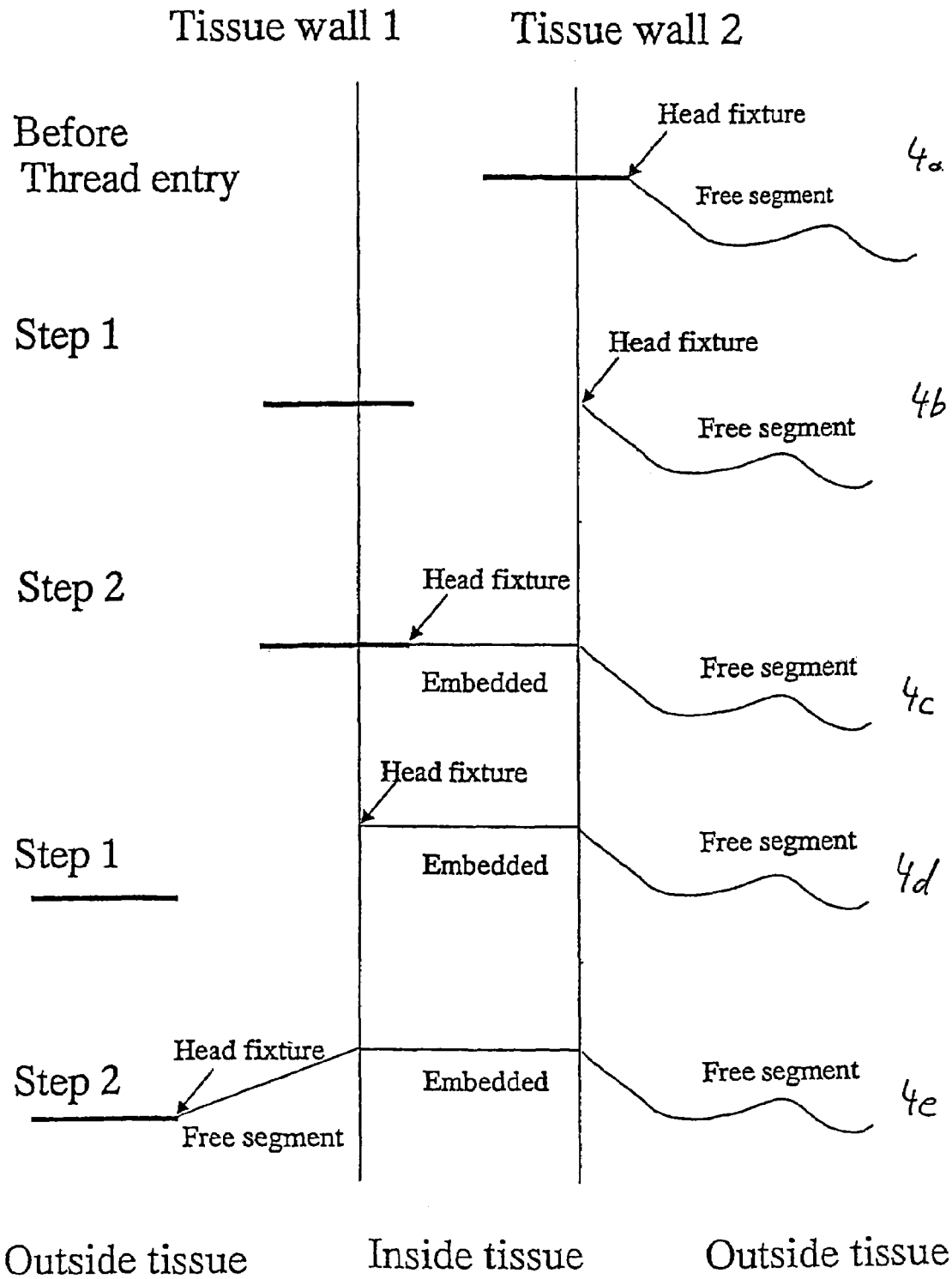

FIG. 1 shows the general structure of a computer simulation system according to the invention, FIG. 2 shows an example of a computer simulation problem to which the invention can be applied, FIG. 3a shows the data structure of the invention as applied to the example of FIG. 2, FIG. 3b shows the general data structure according to the invention, FIG. 4 illustrates an example of the step by step update of the topology of the model during a sewing process.

Reference is first made to FIG. 1, wherein is illustrated the general structure of a computer simulation system according to the invention. The system receives input data through an input interface 1. This input can come from a keyboard and a mouse, or from more dedicated simulation equipment simulating various tools or controls. It can also come from external storage means or a communications line or a network. Further the system comprises a processor 2 and storage means 3. The processor 2 is capable of accessing data and instructions stored on the storage means 3 and operate on the stored data as well as the input data in accordance with the instructions. The results of the operations performed on basis of the instructions can be stored on the storage means 3 and/or delivered to output interface 4. The results of the operations performed by the processor will most often at least include a video representation of the simulation to be delivered to a display, such as a video monitor or video display goggles, but may also include force feedback or tactile feedback information to be delivered to the input means connected to the input interface.

The processor 2 of the simulation system may be the CPU of a personal computer or workstation, but it may also be the combination of several processor circuits, including special graphics processors. The storage means 3 or computer readable medium may in principle include any kind of storage means, such as a hard disk, a CD-ROM, memory circuits etc.

Reference is now made to FIG. 2. Here is shown an example of a computer simulation problem to which the invention will be applied. The example is drawn from the field of surgical simulation for training of physicians. In addition to a thread 10, the figure shows a number of geometrical objects with which the thread interacts. In this example these objects include a needle 12 attached to the end of the thread and that is being held by a tool 14. Also shown are two flexible tissues 16, 18 which it is the purpose to sew together during the simulation. The geometrical description of these additional objects is not part of the invention, and will not be discussed in detail. However, it will be natural to describe the needle 12 as a stiff curve (i.e. a curve that can not change shape during the simulation), to describe the tool 14 as a stiff object possibly by describing its bounding surfaces, and to describe the tissues 16, 18 as flexible objects again geometrically represented by their bounding surfaces. If the tissue has a wall like shape, for instance the walls in an artery tube, it can be described by two surfaces, one outer surface 16a, 18a and one inner surface 16b, 18b.

In order to describe this situation in accordance with the invention, fixture points are introduced. A minimum of six fixture points are required for the modeling of the situation in the figure. It should be noted, though, that they will be introduced during the simulation as is described below with reference to FIG. 4. One fixture point 20 is positioned where the needle is attached to the thread, two fixture points 22, 24 where the thread enters and leaves the first flexible tissue 16, two fixture points 26, 28 where the thread enters and leaves the second flexible tissue 18, and one fixture point at the end of the thread 29. This results in a first free segment 30 between the needle fixture point 20 and the first tissue wall fixture point 22, an embedded segment 32 between the tissue wall fixture points 22, 24, a free segment 34 between the inner tissue wall fixture point 24 of the first tissue 16 and the inner tissue wall fixture point 26 of the second tissue 18, an embedded segment 36 again between the two fixture points 26, 28 of the second tissue 18, and a free segment 38 between the outer tissue wall fixture point 28 and the end fixture point 29.

Note that there is nothing in the data structure that prevents the inclusion of additional fixture points subdividing the free segments, but that none are included in this example.

FIG. 3a illustrates the data structure for a part of the problem illustrated in FIG. 2. The data structure will be described as objects and pointers in an object oriented paradigm, but it should be noted that the principles of the invention are not limited to this. Other descriptions that allow for a similar exchange of data and calculation of shapes and positions of segments and fixture points, would fall within the scope of the invention. However, it will be understood from the following presentation that an object oriented language is a preferable means of creating the data structure.

It should also be noted that the following description includes a certain redundancy regarding pointers. It is not necessary for all objects that are pointed to by another object to include a pointer pointing back at that other object. Also, it is not strictly necessary for two adjacent segments to point at each other, since they will be connected by the fixture point they have in common. However, increasing the number of pointers will reduce the number of searches that must be done when going back and forth through the data structure e.g. when updating the model, something that will facilitate a rapid update during real time simulation. It would be sufficient, however, to include enough pointers to connect all the objects of the model. It is preferred to include at least pointers from all segment objects to connected segments and fixture points and pointers from fixture point objects to connected tissue objects (or whatever other external geometrical objects are included in the simulation).

The other parts of the model could be constructed according to traditional scene graph theory, as is well known in the art.

Since the invention as such is limited to the description of fixture points and segments, these are drawn with bold lines in FIG. 3a, whereas additional objects with which they interact but which are not part of the invention are drawn with finer lines. The reference numbers correspond with those in FIG. 2 for corresponding objects.

Going from the top of FIG. 3a, there is first an object representing the tool 14. This object contains at least one pointer pointing to the needle object 12. In the same way the needle object 12 contains a pointer pointing to the tool object 14. The needle 12 and the first segment 30 of the thread 10 are connected by the first fixture point 20. As illustrated, all these objects may contain pointers pointing to each other.

The first segment 30 of the thread 10 is a free segment. This segment is connected to the second segment 32 of the thread 10 by a second fixture point 22. The second segment 32 is an embedded segment, which again is connected to a free segment 34 by a third fixture point 24. Finally there is another embedded segment 36 connected to the second free segment 34 by a fourth fixture point 26.

The fixture points 22, 24, 26 that are connecting embedded segments 32, 36 also have pointers pointing to tissue objects 16a, 16b, 18a and vice versa.

The sequence of segments illustrated in FIG. 3a, (free segment, embedded segment, free segment, embedded segment) is typical, but not mandatory. As already noted, two free segments could be connected to each other, and the same could two embedded segments.

The geometrical description of the various objects, particularly the segments, can be contained in the objects themselves, but preferably they are described in separate objects pointed to by the objects they describe. Hence, each segment, whether free or embedded, contains an additional pointer pointing to a geometrical object, or a curve object.

In addition to the references between the objects themselves, the objects contain various data and functions and/or references to additional objects containing data and functions. The following is a more complete description of the data objects included in the data structure. Reference is made to FIG. 3b, which shows the general structure of the data model including relations between the various object types. Again it should be noted that it is not necessary to include all the pointers illustrated, as described above.

Segments can be of different types according to the roles they play in the simulation. The difference between these can be expressed internally in the respective object, or externally, as a result of what other data objects they point to. The two fundamental types of segments, embedded segments and free segments, can be of the same object type, but embedded segments will be defined by referring to fixture points, that are attached to the surfaces of other objects and by referring to curve objects that define a straight line between these fixture points. However the segment objects are defined, some data is common to all segment objects. In a preferred embodiment of the invention this includes pointers to two fixture points, one at each end of the segment, pointers to the neighboring segments, if they exist, a pointer to a curve object describing the geometry of the segment, a variable containing the span of the segment, i.e. the distance between the two fixture points at the respective ends of the segment and a variable containing the length of the segment measured along the thread. The length is a result of a bookkeeping process, so that the length is increased every time the segment receives more length from an adjacent segment and is decreased every time the segment yields length to an adjacent segment. Span is calculated from information received from the respective fixture points. The necessary functions for calculating and updating the values of these two variables are preferably included in the segment object as local functions.

The total length of the thread will be the sum of the length of all the segments. Unless the thread is described with a certain elasticity, the total length of the thread will be constant, but one segment may give up length to an adjacent segment as described below.

Fixture points can be shared by two segments, and thereby define a topological connection. A fixture point may also represent the free end of the thread and only be connected to one segment. Normally, the fixture point will also be connected to an additional object. In our surgery example this additional object will usually represent tissue, but may also represent a surgical tool. A fixture point may also be shared by only one segment of the thread and another object, such as a needle or a tool.

Fixture point objects generally contain the following data: Two pointers pointing to the segments connected by the fixture point, if they are present (only one has to be), pointers to any other geometrical object to which the fixture point is attached, such as a tool, a needle or tissue, and a variable containing the position of the fixture point. In addition the fixture point object preferably contains variables containing the tangents of the segments connected by the fixture point. If the two segments are both free, these variables will normally contain the same values, since the thread is considered tangentially continuous. In principle, however, the thread does not have to be tangentially continuous, and normally it will not be in cases where one of the segments is embedded.

The fixture points define connections that serve to exchange data between objects. If one fixture point is moved, the result may be that other fixture points are moved or that the length of the various segments is changed. The fixture points serve as reference points for this exchange of data, which may be calculated recursively or simultaneously. This is described in further detail below.

Curve objects are objects referred to by segments. For each segment there is one curve object defining the geometrical shape of that segment. This curve object contains the numerical description of the segment, including shape parameters, such as flexibility and gravity vector, and shape calculation algorithms. The curve object receives information from the segment and the fixture points, including span, length and fixture point positions, and based on this input, the shape is calculated and stored in the curve object. The curve object may also contain a choice of algorithms and parameters in order to balance the need for speed and accuracy.

In a preferred embodiment the curve is implemented as a B-spline, but other formats could be used, such as polygon segments, implicit description, analytical segments, etc.

There are two basic operations that can be performed on the data structure. These are an update of the thread shape and an update of the thread topology (i.e. the number of segments and their sequence). The following is a general description of these operations, illustrating the flexibility of the invention. It should be pointed out, though, that a large number of different algorithms could be implemented for calculating the shape of individual segments, for distributing length and force along the thread, for exchanging information between the thread and the environment etc. The following description will not attempt to cover all such possibilities, as they would represent different uses to which the invention could be applied rather than the invention itself.

First the update of the thread shape as the result of the movement of a fixture point will be described. In this situation the topology of the model is not changed. The thread is composed of the same number and types of segments before and after the update, no additional fixture points have been introduced, and no additional pointers to other objects have been introduced.

For convenience this description refers to FIG. 3a and starts with the movement of the fixture point 20 at the end of the thread 10, where it is connected to a needle 12. It would also be possible to start with the movement of a fixture point somewhere in the middle of the thread, something that would result in an update of the shape of the thread in two directions. Also, again for convenience, the description will be based on a simplified system where force is not taken into consideration, and where length is not exchanged with adjacent segments until, when tightening the thread, ratio between span and length is increased until it equals 1 (i.e. there is no more slack between the fixture points). Slackening of the thread could be described as a partial return to the previous situation. The data structure and method of the invention does, however, allow for a more sophisticated algorithm including force, elasticity of the thread and other objects (tissue) etc.

The various functions for exchanging length from one object to another and for moving fixture points will preferably be implemented in each object. When one fixture point is moved, update of the other objects is then done in a recursive manner starting from the fixture point that is moved and progressing along the thread. If the fixture point that is moved is not at one of the ends of the thread, this update will go in both directions of the thread. The update should be administered globally however, e.g. by way of an administration algorithm in the fixture point that is moved, in order to ensure that no illegal updates are performed (such as one segment assuming that it receives more length from following segments than actually is available) and so that updates do not travel back and forth along the thread without terminating.

When the first fixture point 20 is moved so far that the span of the first segment 30 exceeds its length, the segment must receive length from other segments. The following segment 32 is embedded, and will not change neither span nor length. This means that all the length segment 30 receives from segment 32, segment 32 will immediately receive from segment 34. Segment 30 will only receive enough length for its length to equal its span, in other words it will be tight. The curve object pointed to by segment 30 will calculate the new shape of segment 30 as a straight line. Segment 32 will not be changed. Segment 34 will have the same span, but its length will be reduced by the same amount as that with which segment 30 is increased. The curve object pointed to by segment 34 will recalculate the shape of segment 34 based on the new length.

If all the segments are tight (or if the model includes friction and force), an additional stretching of segment 30 through movement of fixture point 20 will result in an update of the position of fixture point 22, which will be moved in a direction based on the directions of the two segments 30 and 34 (if both segments 30 and 34 are tight, the fixture points 22 and 24 will be moved in a direction somewhere between the directions towards the fixture points at the opposite ends of segments 30 and 34, respectively). This will result in the movement of fixture point 24 and also in an update of the shape of the tissue object 16. The movement of the fixture points and the update of the tissue object will decrease the span of free segments connected to the fixture points being moved. The segments will remain tight, however, and the length by which the respective segments are reduced will be passed on to segment 30 so that the total length of the thread remains constant.

The new position of fixture point 24 will reduce the span of segment 34, but since segment 30 is still tight, segment 34 will not slacken. Instead it will give its extra length to segment 32 which immediately passes it on to segment 30. Every time fixture points are moved and length is exchanged, the relevant curve objects update the curve shape of the relevant segment. Whether the update is performed as a recursive update along the thread or as a simultaneous update of all the involved objects is a matter of implementation. The important point is to keep the length of the thread constant (unless elasticity is introduced), and to exchange information between objects as a result of the topology defined by the fixture points.

The data structure allows for more sophisticated update algorithms that include force along the tangents of the segments in the fixture points, and friction. Rules included in the update algorithm can e.g. distribute the applied force into tightening the segment, moving fixture points and overcoming friction (i.e. gaining length from the next segment).

The operations described above change the parameters of the segments, such as length, span and fixture point position. According to the invention the shape of the individual segments can be calculated independently after these conditions have been established. This is because segments are only influenced by other objects at their respective ends. In other words, the shape of one segment does not influence the shape of any other segment. The problem of calculating the shape can be formulated as an optimization problem of minimizing the potential energy of each segment. This can be done as:

$$\min J(y) = \tfrac{1}{2} \int \beta |y''|^n - fy \, ds$$

subject to y in K, where $$K = \{y | y \text{ in } H^2(0,L;R^3), |y'(s)| = 1 \text{ on } [0,L]\},$$

plus boundary conditions:

$$y(0)=y0,\ y(L)=y1,\ y'(0)=y0',\ y'(L)=y1'$$

The integral is taken over the length of the segment, and where
J(y) is an expression of the potential energy of the thread,
y is the unknown curve segment with s as parameter,
y0, y1 are boundary positions in Euclidian 3-space,
y0', y1' are boundary unit tangents in Euclidian 3-space,
L is the length of the segment,
β is the flexibility of the segment, f is an external force, such as gravity, $R^3$ is the Euclidean 3-space, and $H^2$ is the Sobolev space of distributions with quadratically integrable derivatives of order less or equal to 2.

The values of y0 and y1 are given by the positions of the fixture points, and y0' and y1' will normally be defined by either the direction of an adjacent embedded sequence, the direction of an attached tool, or these will be overridden e.g. because of a tangential discontinuity due to the segment being too tight.

One solution to this problem is described in "Augmented Lagrangian and Operator-Splitting Methods in Nonlinear Mechanics", by Roland Glowingski and Patrick Le Tallec, Society for Industrial and Applied Mathematics, Philadelphia, 1989, p 268, which is hereby incorporated by reference.

It should be noted that the preferred element basis according to the invention (B-splines) is different from the one described.

The data structure according to the invention is very flexible and allows easy update also of the topology of the thread, i.e. number of segments and their sequence.

Segments can be added or deleted by exchanging information between them and adding or deleting fixture points. For instance, if a tool grabs the thread in the middle of a free segment, a new fixture point would be added, as well as a new segment. The new segment would receive data regarding its length from the original segment, and new segment spans would be calculated. The two segments would be connected by the new fixture point.

FIG. 4 illustrates an example of the step by step update of the model during a change in the topology of the thread, that is in the ordering and number of segments. The example is that of the process of pulling a thread through an other object, such as tissue, in a sewing simulation. The example will not consider functions for hit detection between needle and tissue or calculation of deformation of the tissue because of the thread, since these interactions are outside the scope of the invention.

The update of the data structure will comprise two steps, and these are the same when the thread enters and leaves the tissue.

Before the thread enters the tissue, the situation is as illustrated in FIG. 4a, with a thread segment attached to a needle by way of a fixture point. In a first step, when the needle has passed through the tissue wall, as in FIG. 4b and 4d respectively, the fixture point is moved to the hit point, and the shape of the thread is updated as described above. There is now a gap between the needle and the fixture point. In a second step, a straight (or tight) segment is added from the fixture point at the hit point to the end of the needle. This is illustrated in FIG. 4c, where the new segment is embedded, and in FIG. 4e, where the new segment is a free segment.

In both cases the new segment receives length from the other segments and the shape of the respective segments are updated as described above.

The examples and embodiments described above are intended to explain the principles of the invention and its application to a particular real world problem. A number of modifications to the described examples will fall within the scope of the invention. For instance the invention could be implemented on a general purpose computer or a dedicated simulation system. It could be connected to general input and/or output means such as a mouse and a computer display, or to specialized input and output devices such as tool simulators or special purpose control means and stereo display goggles. The exact number of pointers, variables and functions contained in the various objects can be chosen in various ways, and the invention could be applied to simulation of a number of different simulations of situations involving threads, sutures, cables, wires or the like, and all such alternatives fall within the scope of the invention as defined by the appended claims.

The invention claimed is:

1. Method for providing a visual representation, for display on a screen, of a thread as a geometric object in a three dimensional computer graphics system, where the thread interacts with geometrical objects in the three dimensional computer graphics system, the method comprising:

generating a set of fixture points representing points in space where the thread interacts with the geometrical objects;

generating a set of one or more segments representing the thread between adjacent fixture points;

linking each segment to the fixture points at each end of the respective segment; and describing the geometrical properties of each segment, characterized in that movement of the thread is described by moving one fixture point and recalculating the shape and length of the segments between adjacent fixture points, starting from the fixture point that is moved and going recursively and progressing along the length of the thread.

2. Method according to claim 1, wherein the segments are either:

embedded segments that represent the thread passing through another geometric object; or free segments that describe the thread interacting with other geometrical objects only at the ends of the objects.

3. Method according to claim 2, characterized in that the shape of an embedded segment is a straight line between fixture points at the surface of the geometric object through which the thread passes.

4. Method according to claim 1, characterized in that the shape of one or more segments is calculated as an approximation to a solution of an optimization problem of minimizing the potential energy of each segment.

5. Method according to claim 4, characterized in that the potential energy of a segment is expressed as $$J(y) = \tfrac{1}{2} \int \beta |y''| |y''| - fy \, ds$$

subject to y in K, where $$K = \{y | y \text{ in } H^2(0,L;R^3), |y'(s)|=1 \text{ on } [0,L],$$

$$y(O)=yO, y(L)=y1, y'(O)=y'(L)=y1'\}$$

where the integral is taken over the interval [O,L], and where y is the unknown curve segment, y0, y1 are boundary positions in Euclidian 3-space, y0', y1' are boundary unit tangents in Euclidian 3-space, L is the length of the segment, β is the flexibility of the segment, f is an external force, such as gravity, $R^3$ is the Euclidean 3-space, and $H^2$ is the Sobolev space of distributions with quadratically integrable derivatives of order less or equal to 2.

6. Method according to claim 1, characterized in that the geometrical description of any segment is done through a reference to a curve definition including the numerical description of the shape of the respective segment.

7. Method according to claim 6, characterized in that the thread is described in an object oriented computer language so that
each fixture point is described as an object comprising at least
two pointers pointing to the segments adjacent to the fixture point, if present,
pointers to any other geometrical object to which the fixture point is attached,
a variable containing the position of the fixture point,
each segment is described as an object comprising at least
two pointers pointing to the fixture points at each end of the segment,
two pointers pointing to the neighboring segments, if present,
one pointer pointing to a curve object containing the numerical description of the shape of the segment,
each curve definition is described as a curve object comprising at least
shape parameters,
shape calculation algorithms.

8. Method according to claim 7, characterized in that each segment object also comprises a variable containing the span of the segment, defined as the distance between the two fixture points pointed to, and a variable containing the length of the segment, measured along the thread between the two fixture points pointed to.

9. Method according to claim 7, characterized in that each fixture point object also comprises a variable containing values defining the tangent(s) of the segments pointed to by the fixture point object at the position of the fixture point.

10. Method according to claim 7, characterized in that the shape parameters of the curve objects include flexibility and gravity vector, and that the shape calculation algorithms include functions for making geometrical calculations based on length and span information, fixture point positions and endpoint tangents received from the corresponding segment object as well as said shape parameters.

11. Method according to claim 2, characterized in that interaction between any free segment and any other object is described by introducing additional fixture points that divides said free segment into two free segments.

12. Method according to claim 1, characterized in that the length of the thread is kept constant by making corresponding changes of the length of each respective segment so that any change in the length of one segment influences the length of the following segment in a recursive manner.

13. Method according to claim 1, characterized in that update of the model is performed in a framewise manner such that in a first step new data is introduced describing a change to the model, in a second step the model is updated based on the new data, and in a third step the updated model is visualized as a frame in the computer graphics system.

14. Method according to one of the previous claims, characterized in that the thread represents a surgical suture, and the geometrical objects represent tissue of a human body in a surgical simulation system.

15. Simulation system for simulating the behavior of a thread interacting with geometrical objects in a three dimensional computer graphics system, the system comprising:
an input interface for receiving control signals representing manipulation of the simulation system;
storage means wherein is stored a set of instructions and a set of initial data;
a processor which executes instructions stored on said storage means, to generate a three dimensional numerical model of said thread and said geometrical objects, update the three dimensional numerical model based on additional instructions on said storage means and control signals received from said input interface, and generate a video representation of the three dimensional numerical model; and
an output interface for sending said video representation to a display, wherein the initial data on said storage means represent an initial state of the three dimensional numerical model, and wherein the instructions on said storage means at least include instructions for making the processor:
generate a set of fixture points representing points in space where the thread interacts with the geometrical objects,
generate a set of one or more segments representing the thread between adjacent fixture points,
link each segment to fixture points at each end of the respective segment,
describe the geometrical properties of each segment,
generate a video representation of the resulting three dimensional numerical model, and
send the generated video representation to the output interface,
characterized in that movement of the thread is described by moving one fixture point based on input information received over the input interface and recalculating the shape and length of the segments between adjacent fixture points, starting from the fixture point that is moved and going recursively and progressing along the length of the thread.

16. Simulation system according to claim 15, wherein the segments are either:
embedded segments that represent the thread passing through another geometric object; or
free segments that describe the thread interacting with other geometrical objects only at the ends of the objects.

17. Simulation system according to claim 16, characterized in that the shape of an embedded segment is a straight line between fixture points at the surface of the geometric object through which the thread passes.

18. Simulation system according to claim 15, characterized in that the shape of one or more segments is calculated as an approximation to a solution of an optimization problem of minimizing the potential energy of each segment.

19. Method according to claim 18, characterized in that the potential energy of a segment is expressed as $$J(y)=\tfrac{1}{2}\int \beta |y''| |y''| - fy \, ds$$

subject to y in K, where $$K=\{y | y \text{ in } H^2 \, (0,L;R^3), \, |y'(s)|=1 \text{ on } [0, L],$$

$$y(0)=y0, \, y(L)=y1, \, y'(0)=y0', \, y'(L)=y1'\}$$

where the integral is taken over the interval [0,L], and where
y is the unknown curve segment,
y0, y1 are boundary positions in Euclidian 3-space,
y0', y1' are boundary unit tangents in Euclidian 3-space,
L is the length of the segment,
β is the flexibility of the segment,
f is an external force, such as gravity,
$R^3$ is the Euclidean 3-space, and
$H^2$ is the Sobolev space of distributions with quadratically integrable derivatives of order less or equal to 2.

20. Simulation system according to claim 15, characterized in that the geometrical description of any segment is done through a reference to a curve definition including the numerical description of the shape of the respective segment.

21. Simulation system according to claim 20, characterized in that the instructions on said storage means are in an object oriented computer language so that
each fixture point is described as an object comprising at least
two pointers pointing to the segments adjacent to the fixture point, if present,
pointers to any other geometrical object to which the fixture point is attached,
a variable containing the position of the fixture point,
each segment is described as an object comprising at least
two pointers pointing to the fixture points at each end of the segment,
two pointers pointing to the neighboring segments, if present,
one pointer pointing to a curve object containing the numerical description of the shape of the segment,
each curve definition is described as a curve object comprising at least
shape parameters,
shape calculation algorithms.

22. Simulation system according to claim 21, characterized in that each segment object also comprises a variable containing the span of the segment, defined as the distance between the two fixture points pointed to, and a variable containing the length of the segment, measured along the thread between the two fixture points pointed to.

23. Simulation system according to claim 21, characterized in that each fixture point object also comprises a variable containing values defining the tangent(s) of the segments pointed to by the fixture point object at the position of the fixture point.

24. Simulation system according to claim 21, characterized in that the shape parameters of the curve objects include flexibility and gravity vector, and that the shape calculation algorithms include functions for making geometrical calculations based on length and span information, fixture point positions and endpoint tangents received from the corresponding segment object as well as said shape parameters.

25. Simulation system according to claim 16, characterized in that interaction between any free segment and any other object is described by introducing additional fixture points that divides said free segment into two free segments.

26. Simulation system according to claim 15, characterized in that the length of the thread is kept constant by making corresponding changes of the length of each respective segment so that any change in the length of one segment influences the length of the following segment in a recursive manner.

27. Simulation system according to claim 15, characterized in that update of the model is performed in a framewise manner such that in a first step new data is introduced describing a change to the model, in a second step the model is updated based on the new data, and in a third step the updated model is visualized as a frame in the computer graphics system.

28. Simulation system according to one of the claims 15-25 or 26-27, characterized in that the thread represents a surgical suture, and the geometrical objects represent tissue of a human body in a surgical simulation system.

29. A computer-readable medium having stored thereon computer executable program for providing visual representation, the computer program when loaded into a computer, causing the computer to perform the steps of any of the claims 1-11 or 12-13.

30. A method for providing a visual representation of a thread for display on a screen as a geometric object in a three dimensional computer graphics system, the method comprising:
generating a set of fixture points representing points in space where the thread interacts with the geometrical objects;
generating a set of one or more segments representing the thread between adjacent fixture points;
linking the segments to the fixture points at each end of the respective segment; and
describing the geometrical properties of the segments through a reference to a curve definition including the numerical description of the shape of the respective segment,
characterized in that movement of the thread is described by moving one fixture point and recalculating the shape and length of the segments between adjacent fixture points, starting from the fixture point that is moved and going recursively and progressing along the length of the thread.

31. A method for providing a visual representation of a thread as a geometric object in a three dimensional computer graphics system, the method comprising:
generating a set of fixture points representing points in space where the thread interacts with the geometrical objects;
generating a set of one or more segments representing the thread between adjacent fixture points;
linking the segments to the fixture points at each end of the respective segment; and
describing the geometrical properties of the segments, wherein the segments are either embedded segments that represent parts of the thread passing through another geometric object or free segments that represent parts of the thread that only interact with other geometrical objects at the ends of the parts,
characterized in that movement of the thread is described by moving one fixture point and recalculating the shape and length of the segments between adjacent fixture points, starting from the fixture point that is moved and going recursively and progressing alone the length of the thread.

* * * * *